United States Patent [19]

Jackson, Jr. et al.

[11] 4,342,862

[45] Aug. 3, 1982

[54] POLYESTERS OF TRANS-1,4-CYCLOHEXANEDICARBOXYLIC ACID AND 2-PHENYLHYDROQUINONE AND MODIFICATIONS THEREOF

[75] Inventors: Winston J. Jackson, Jr., Kingsport, Tenn.; William R. Darnell, Weber City, Va.

[73] Assignee: Eastman Kodak Company, Rochester, N.Y.

[21] Appl. No.: 248,585

[22] Filed: Mar. 27, 1981

[51] Int. Cl.$^3$ .................................................. C08G 63/18
[52] U.S. Cl. .................................... 528/176; 528/190; 528/191; 528/193; 528/194; 528/271
[58] Field of Search ............... 528/190, 191, 193, 194, 528/176, 271

[56] References Cited

U.S. PATENT DOCUMENTS

| | | | |
|---|---|---|---|
| 4,118,372 | 10/1978 | Schaefgen | 528/190 |
| 4,146,702 | 3/1979 | Morris et al. | 528/190 |
| 4,153,779 | 5/1979 | Jackson, Jr. et al. | 528/190 |
| 4,159,365 | 6/1979 | Payet | 428/364 |

Primary Examiner—Lester L. Lee
Attorney, Agent, or Firm—William P. Heath, Jr.; Daniel B. Reece, III

[57] ABSTRACT

Polymers and copolymers derived from at least 20 mole percent 1,4-cyclohexanedicarboxylic acid of which at least 80 mole percent is trans-1,4-cyclohexanedicarboxylic acid, up to 80 mole percent terephthalic acid, terephthalic acid substituted with 1 or 2 chlorine or bromine atoms or an alkyl group containing 1 to 4 carbon atoms, 2,6-naphthalenedicarboxylic acid, 2,6-naphthalenedicarboxylic acid substituted with 1 or 2 chlorine or bromine atoms or an alkyl group containing 1 to 4 carbon atoms, at least 20 mole percent phenylhydroquinone, 0–45 mole percent hydroquinone and 0–35 mole percent of a hydroquinone substituted with 1 or 2 chlorine or bromine atoms or an alkyl group containing 1 to 4 carbon atoms.

8 Claims, No Drawings

POLYESTERS OF TRANS-1,4-CYCLOHEXANEDICARBOXYLIC ACID AND 2-PHENYLHYDROQUINONE AND MODIFICATIONS THEREOF

TECHNICAL FIELD

This invention is a class of new polymers and copolymers derived from at least 20 mole percent of the diacid chloride of 1,4-cyclohexanedicarboxylic acid of which at least 80 mole percent is trans-1,4-cyclohexanedicarboxylic acid, up to 80 mole percent of the diacid chloride of terephthalic acid, terephthalic acid substituted with 1 or 2 chlorine or bromine atoms or an alkyl group containing 1 to 4 carbon atoms, 2,6-naphthalenedicarboxylic acid or 2,6-naphthalenedicarboxylic acid substituted with 1 or 2 chlorine or bromine atoms or an alkyl group containing 1 to 4 carbon atoms, at least 20 mole percent of 2-phenylhydroquinone, 0–45 mole percent hydroquinone, and 0–35 mole percent of a hydroquinone substituted with 1 or 2 chlorine or bromine atoms or an alkyl group containing 1 to 4 carbon atoms.

The polymers of this invention form anisotropic melts and exhibit excellent tensile strength, stiffness, and impact properties.

The polyesters of this invention are useful as plastics, films, and fibers, and these polyesters may be fabricated to give other types of shaped objects, such as foamed plastics, extruded shapes, and coatings. The polyesters of this invention also may contain nucleating agents, pigments, glass fibers, asbestos fibers antioxidants, stabilizers, plasticizers, lubricants, and other additives.

BACKGROUND ART

U.S. Pat. No. 4,159,365 discloses polyesters of terephthalic acid and phenylhydroquinone modified with up to 10 mole percent, based on total moles of units, of other aromatic or cycloaliphatic polyester-forming units. This 10 mole percent modification corresponds to 20 mole percent if based on the dicarboxylic acid alone or diol alone (the method we use to calculate our compositions). The use of a cyclohexanedicarboxylic acid is not disclosed. According to column 2, lines 4–6, "melt polymerization . . . is used for the polymer synthesis". Melt polymerization with phenylhydroquinone dipropionate causes trans-1,4-cyclohexanedicarboxylic acid to isomerize to give about 35 mole percent of the cis isomer, which reduces the liquid crystallinity of the polymer and thereby reduces the physical properties which can be attained. This isomerization of the trans to the cis dicarboxylic acid is unexpected, because the trans acid does not isomerize during the preparation of polyesters from trans-1,4-cyclohexanedicarboxylic acid and chlorohydroquinone diacetate or methylhydroquinone diacetate.

U.S. Pat. No. 4,118,372 discloses liquid crystalline copolyesters prepared with 1,4-cyclohexanedicarboxylic acid and substituted hydroquinones such as chlorohydroquinone diacetate. All polymers are prepared in the melt (column 5 and examples). The use of phenylhydroquinone is not disclosed.

DISCLOSURE OF THE INVENTION

This invention is a novel class of polyesters derived from liquid crystalline polyesters having film- and fiber-forming molecular weights, said polyesters being derived from (A) at least 20 mole percent of the diacid chloride of 1,4-cyclohexanedicarboxylic acid of which at least 80 mole percent is trans-1,4-cyclohexanedicarboxylic acid, (B) 0–80 mole percent of other acids selected from the diacid chloride of terephthalic, terephthalic acid substituted with 1 or 2 chlorine or bromine atoms or an alkyl group containing 1 to 4 carbon atoms, 2,6-naphthalenedicarboxylic acid and 2,6-naphthalenedicarboxylic acid substituted with 1 or 2 chlorine or bromine atoms or an alkyl group containing 1 to 4 carbon atoms, (C) at least 20 mole percent 2-phenylhydroquinone, (D) 0–45 mole percent hydroquinone, and (E) 0–35 mole percent of a hydroquinone substituted with chlorine or bromine atoms or an alkyl group containing 1 to 4 carbon atoms. Preferred polymers are liquid crystalline polyesters wherein the polyesters are derived from at least 50 mole percent (A) and at least 50 mole percent (C); liquid crystalline polyesters wherein the polyesters are derived from at least 80 mole percent (A) and at least 80 mole percent (C); and liquid crystalline polyester wherein the polyester is derived from 100 mole percent (A) and 100 mole percent (C).

The polyesters of this invention form anisotropic melts and exhibit excellent tensile strength, stiffness, and impact properties. In particular, the invention concerns the polyester (and certain copolyester modifications) of phenylhydroquinone with 1,4-cyclohexanedicarboxylic acid which contains at least 80, and preferably >90 mole percent of the trans-1,4-cyclohexanedicarboxylate moiety.

Polyesters which form anisotropic (liquid crystalline) melts are prepared from symmetrical or para-substituted aromatic monomers. Among these monomers are trans-1,4-cyclohexanedicarboxylic acid and phenylhydroquinone. However, when the polyester of these monomers is prepared by conventional melt polymerization techniques (such as from trans-1,4-cyclohexanedicarboxylic acid and phenylhydroquinone diacetate), the trans-1,4-cyclohexanedicarboxylate moiety is isomerized to ~65/35 trans/cis configuration. Such polyesters do not give anisotropic (liquid crystalline) melts and do not exhibit the excellent stiffness and impact properties obtained when the 1,4-cyclohexanedicarboxylate moiety is essentially all trans.

The polyesters and copolyesters of this invention may be prepared by reacting the desired ratio of trans-1,4-cyclohexanedicarboxylic acid chloride, certain substituted or unsubstituted terephthaloyl chlorides, or 2,6-naphthalenedicarboxylic acid chloride with the desired ratio of phenylhydroquinone and substituted or unsubstituted hydroquinones in an inert solvent below its boiling point, using a tertiary amine as an acid acceptor. Any tertiary amine is suitable as an acid acceptor so long as little or no reaction of the amine with the acid chlorides occurs to limit the molecular weight of the polymers obtained. Pyridine is the preferred acid acceptor.

The quantity of acid acceptor utilized in the reaction is at least equivalent to the HCl liberated during the reaction and may be present in 100–200 mole percent excess or more. From an economic standpoint, it is advantageous to minimize the acid acceptor to about 5 to 100 mole percent excess. Preferably the quantity of acid acceptor used is 10 to 50 mole percent in excess of the total HCl liberated during the reaction.

Suitable solvents for the polymerization are those which are inert toward the reactants at the reaction temperature and have adequate solvent capability such that the polymer obtained has an I.V. of at least about 1.0. Examples of such solvents are dichloromethane, 1,2-dichloroethane, and chlorobenzene. Dichloromethane is the preferred solvent.

The reaction may be carried out at any temperature up to the boiling point of the solvent, so long as the solvent remains inert toward the reactants and the reactants are not decomposed. Preferably the reaction is carried out at about room temperature.

The substituted hydroquinones suitable as modifiers in this invention may contain one to two substituents. These substituents include chlorine, bromine, or alkyl groups containing up to four carbon atoms. Examples of such substituted hydroquinone modifiers are chlorohydroquinone, methylhydroquinone, and tert-butylhydroquinone. Unsubstituted hydroquinone may also be used as a modifier. Relatively high levels of some modifiers, such as unsubstituted hydroquinone, may cause partial precipitation of the polymer during polymerization. The polymer molecular weight (I.V.) is then limited by the low solubility of the polymer. Up to ~80 mole percent of the substituted or unsubstituted hydroquinone modifiers may be used in the invention, so long as the polymer obtained has an I.V. of at least about 1.0.

The substituted terephthaloyl chlorides which are suitable as modifiers in the invention may contain one or two substituents. These substituents include chlorine, bromine, or alkyl groups containing up to four carbon atoms. Examples of such modifiers are chloroterephthaloyl chloride, bromoterephthaloyl chloride, dichloroterephthaloyl chloride, and methylterephthaloyl chloride. Also, 2,6-naphthalenedicarboxylic acid chloride may be used as a modifier. Relatively high levels of some modifiers, such as dichloroterephthaloyl chloride or 2,6-naphthalene dicarboxylic acid chloride, may cause partial precipitation of the polymer during polymerization. The polymer molecular weight (I.V.) is then limited by the low solubility of the polymer. Up to about 80 mole percent of acid chloride modifiers may be used in the invention, so long as the polymer obtained has an I.V. of at least 1.0.

In addition to the solution procedure previously described, the polymers of the invention may be prepared by an interfacial technique, such as by adding a solution of the acid chlorides in an inert, water-immiscible solvent to an aqueous solution of the sodium or potassium salts of the substituted or unsubstituted hydroquinone (containing catalysts known to those skilled in the art) and stirring vigorously until the reaction is complete.

When a relatively low molecular weight polymer is obtained due to partial hydrolysis of the acid chlorides during the reaction or if slightly impure acid chlorides are used in the polymerization, phosgene gas may be bubbled very slowly into the rapidly stirred reaction mixture in order to maximize the polymer molecular weight, so long as adequate acid acceptor is present in the reaction mixture.

The polymers are purified and isolated by methods well known to those skilled in the art. Purification involves the neutralization of any excess acid acceptor with dilute acid, such as hydrochloric or acetic, and washing with water until free of salt impurities. The polymers are isolated by adding the purified polymer solution to a nonsolvent, such as acetone, hexane, or methanol, in a Waring blender. Hexane is a preferred nonsolvent. If advantageous, the nonsolvent may be added to the polymer solution in a Waring blender to precipitate the polymer.

This invention will be further illustrated by the following examples although it will be understood that these examples are included merely for purposes of illustration and are not intended to limit the scope of the invention.

EXAMPLES

In the examples, the inherent viscosities of the polyesters are determined at 25° C. in a 40/36/24 weight mixture of p-chlorophenol/phenol/1,1,2,2-tetrachloroethane at a concentration of 0.1 g./100 ml. The melting points are determined with a Perkin-Elmer DSC-2 differential scanning calorimeter. Films are pressed in a Hannafin press at 10°-20° C. above the melting point of the respective polyesters. The trans-isomer content of the polyesters is determined with a Bruker HX-90E carbon-13 NMR spectrometer, using 50/50 volume percent of trifluoroacetic acid/d-chloroform as a solvent. The polyesters are dried in an oven at 100° C. over night and injection molded to give $2\frac{1}{2} \times 3/8 \times 1/16$-inch tensile bars and $5 \times \frac{1}{2} \times \frac{1}{8}$-inch flexure bars for testing. ASTM procedures are used for measuring the tensile strength and elongation (ASTM D-1708), flexural modulus (ASTM D-790), Izod impact strength (ASTM D-256 Method A), and heat deflection temperature (ASTM D-648).

1. This example illustrates that the trans-1,4-cyclohexanedicarboxylate moiety is not isomerized during solution polymerization and that such polyesters are liquid crystalline. This example also illustrates the excellent stiffness and impact properties of polyesters containing the trans-1,4-cyclohexanedicarboxylate moiety. A 2000 ml. 3-necked flask is equipped with a glass stirrer with Teflon blade, an inlet for nitrogen, a thermometer, a 250 ml. pressure-equalizing funnel, an outlet for the system, and a chilled water cooling bath. All of the glassware is placed in a forced-air oven at 130° C. for 30 minutes to dry and, while still hot, is placed in a dry box. To the dry flask while in the dry box are added the following ingredients which were weighed out in the dry box: 44.84 g. (0.24 mole) 2-phenylhydroquinone (distilled and stored in dry box), 77 g. (0.96 mole) of dry pyridine, and 240 ml. of dry dichloromethane. The reaction flask is then removed from the dry box and stirred under nitrogen at 25° C. until a clear, light yellow solution is obtained. To the dry 250 ml. pressure-equalizing funnel while in the dry box are added 50.16 g. (0.24 mole) $\geq 95\%$ trans-1,4-cyclohexanedicarboxylic acid chloride and 160 ml. of dry dichloromethane. A clear solution is obtained in the funnel which is then fitted to the reaction flask. While under a nitrogen atmosphere, the contents of the flask are stirred and cooled to 15° C. while the contents of the funnel are added over a period of 200 minutes. During this period the solution viscosity increases substantially, and 425 ml. of additional dry dichloromethane are added to reduce the solution viscosity. The polymerization is stirred continuously for an additional 50 minutes, and the slow addition of phosgene gas is begun. The phosgene is slowly bubbled into the rapidly stirred polymerization mixture until 1.3 g. of phosgene have been added during 30 minutes. During this period the solution viscosity increases markedly, but no gel is apparent. The polymerization mixture is stirred for an additional 20 minutes after the phosgene addition is stopped, and the polymerization mixture is transferred to a 5000 ml. flask for neutralization and purification. The mixture is then diluted with 800 ml. of dichloromethane. The excess pyridine is neutralized by slowly adding 600 ml. of 1.7 M aqueous HCl to the stirred and cooled polymerization mixture and stirring for an additional 20 minutes. The organic layer is separated and washed repeatedly with 500 to 600 ml. portions of deionized water until the wash water gives a negative test for chloride ion with aqueous $AgNO_3$. The polymer is isolated by slowly adding the washed dichloromethane solution to hexane in a Waring blender. After being washed twice with additional hexane, the polyester is filtered out and vacuum dried at 80° C. over night. The polyester is white and fibrous and weighs 72.6 g. The inherent viscosity of the polyester is 2.34 and the 1,4-cyclohexanedicarboxylate moiety is >95% trans. A film of the polyester pressed at 320° C. is opaque and pearlescent. Opaque, pearlescent bars of this polyester are molded at 280° C. and 500 psi. A summary of properties of this polyester is given in Table 1.

2. This example illustrates the isomerization of the trans-1,4-cyclohexanedicarboxylate moiety during the melt polymerization procedure disclosed in U.S. Pat. No. 4,159,365.

A mixture of 51.60 g. (0.30 mole) ≧98% trans-1,4-cyclohexanedicarboxylic acid, 89.40 g. (0.30 mole) 2-phenyl-p-phenylene dipropionate, and 0.085 g. (100 parts of magnesium per million parts of polymer) magnesium acetate.$4H_2O$ are placed in a 500 ml. flask equipped with a stirrer, a short distillation column, and an inlet for nitrogen. The flask is evacuated and purged three times with nitrogen before being lowered into a metal bath maintained at 110° C. The mixture is heated under a nitrogen atmosphere with stirring as the temperature is increased to 250° C. After about 10 minutes heating and stirring at 250° C., propionic acid begins to distill from the reaction flask. After the reaction flask has been heated for one hour (total) at 250° C., the distillation of propionic acid has slowed substantially. The reaction mixture is pale, transparent yellow. The temperature of the metal bath is then increased to 275° C. About 50 minutes later the metal bath temperature is increased to 300° C. After the reaction mixture is heated at 300° C. for 30 minutes, the bath temperature is increased to 325° C. and, after the reaction flask is stirred at 325° C. for 5 minutes, vacuum is applied. The pressure is reduced during 11 minutes to 0.3 torr. After stirring is continued under <0.5 torr at 325° C. for about 60 minutes, a very high melt viscosity polymer (wound up on the stirrer shaft) is obtained. The polymer is light yellow and transparent with little or no haze detectable. The I.V. of the polyester is 0.72, and a film pressed at 350° C. is pale yellow, transparent, and tough. The glass transition temperature of the polyester is 115° C., but no melting point is detected. Analysis by carbon-13 NMR indicates the cyclohexanedicarboxylate moiety is 64/36 trans/cis. A summary of the properties of this polyester is given in Table 1.

TABLE 1

| Property | Polymer from Example 1 | Polymer from Example 2 |
| --- | --- | --- |
| Inherent viscosity | | |
| before molding | 2.34 | 0.72 |
| after molding | 2.10 | 0.65 |
| Film clarity | opaque | transparent |
| Glass transition temp., °C. | 119 | 115 |
| Melting point, °C. | 258 | none detected |
| Trans-1,4-cyclohexanedicarboxylate moiety, mole % (after molding) | 90 | 64 |
| Mold shrinkage, % | 0.0 | 0.4 |

TABLE 1-continued

| Property | Polymer from Example 1 | Polymer from Example 2 |
| --- | --- | --- |
| Molding temp./pressure, °C./psi | 280/500 | 280/1200 |
| Tensile properties | | |
| break strength, psi | 39,700 | 12,100 |
| yield strength, psi | none | none |
| breaking elongation, % | 7 | 8 |
| Flexural properties | | |
| flexural strength, psi | 30,840 | 15,800 |
| flexural modulus, psi | 1,194,000 | 407,000 |
| Heat deflection temp., °C., 264 psi | 96 | 87 |
| Impact properties | | |
| Izod, notched, ft.-lb./in. of notch | 3.7 | 0.96 |
| Izod, unnotched, ft.-lb. | 13.8 | 5.70 |

Table 1 gives a comparison of the properties of the poly-1,4-cyclohexanedicarboxylate polyester of phenylhydroquinone prepared by a solution procedure (polymer from Example 1) and a melt procedure (polymer from Example 2). The polymer from Example 2 (melt procedure) exhibits typical properties for a nonliquid-crystalline polyester. Note that the I.V. of the polymer from Example 2 (0.72) (melt prepared) is typical because the high melt viscosity of this polymer limits the I.V. obtained. The polymer from Example 1 contains a very high level of trans-1,4-cyclohexanedicarboxylate moiety (relative to the melt prepared polymer) and exhibits moldability and molding properties which are very superior to those of the polymer from Example 2, i.e., molding temperature/pressure 280° C./500 psi vs. 280° C./1200 psi (even though the I.V. of the polymer from Example 1 is much higher: 2.34); mold shrinkage of 0.0% vs. 0.4; tensile break strength 39,700 psi vs. 12,100; flexural modulus 1,194,000 psi vs. 407,000 psi; heat deflection temperature 96° C. vs. 87° C.; and notched Izod impact strength 3.7 vs. 0.96 ft.-lb./in. of notch.

3. This example illustrates the modification of poly(2-phenyl-1,4-phenylene-trans-1,4-cyclohexanedicarboxylate) with 80 mole percent of 2-methylhydroquinone.

A copolyester of trans-1,4-cyclohexanedicarboxylic acid chloride with 80/20 molar ratio of 2-methylhydroquinone/2-phenylhydroquinone is prepared by the method of Example 1. The I.V. of the copolyester is 3.02 and the trans-isomer content in the 1,4-cyclohexanedicarboxylate moiety is >90%. A film pressed at 340° C. is opaque, tough, and pearlescent.

4. This example illustrates the modification of poly(2-phenyl-p-phenylene-trans-1,4-cyclohexanedicarboxylate) with 80 mole percent of terephthalic acid.

A copolyester of 2-phenylhydroquinone with 80/20 molar ratio of terephthaloyl chloride/trans-1,4-cyclohexanedicarboxylic acid chloride is prepared by the method of Example 1. Some precipitation of the polymer is evident during the polymerization. The I.V. of the copolyester is 2.95, and a film pressed at 325° C. is opaque, tough, and pearlescent. The trans-isomer content in the polymer is not determined because the polymer is insoluble in the NMR solvent.

5. This example illustrates the modification of poly(2-phenyl-p-phenylene-trans-1,4-cyclohexanedicarboxylate) with 2,6-naphthalenedicarboxylic acid.

A copolyester of 2-phenylhydroquinone with a 50/50 molar ratio of trans-1,4-cyclohexanedicarboxylic acid chloride/2,6-naphthalenedicarboxylic acid chloride is prepared by the method of Example 1. Partial precipitation of the polymer is evident during the polymerization. The I.V. of the copolyester is 1.55. The trans-isomer content of the polymer is not determined because the polymer is not soluble in the NMR solvent. A pressed film is opaque and pearlescent.

6. This example illustrates the modification of poly(2-phenyl-1,4-phenylene-trans-1,4-cyclohexanedicarboxylate) with 50 mole percent of 2-t-butylhydroquinone.

A copolyester of trans-1,4-cyclohexanedicarboxylic acid chloride with 50/50 molar ratio of 2-phenylhydroquinone/2-t-butylhydroquinone is prepared by the method of Example 1. The I.V. of the copolyester is 2.55 and the trans-isomer content in the 1,4-cyclohexanedicarboxylate moiety is >90%. A film pressed at 350° C. is opaque, tough, and pearlescent.

The invention has been described in detail with particular reference to preferred embodiments thereof, but it will be understood that variations and modifications can be effected within the spirit and scope of the invention.

We claim:

1. Liquid crystalline polyesters having film- and fiber-forming molecular weights, said polyesters being prepared by reacting (A) at least 20 mole percent of the diacid chloride of 1,4-cyclohexanedicarboxylic acid of which at least 80 mole percent is trans-1,4-cyclohexanedicarboxylic acid, (B) 0–80 mole percent of the diacid chloride of other acids selected from terephthalic, terephthalic acid substituted with 1 or 2 chlorine or bromine atoms or an alkyl group containing 1 to 4 carbon atoms, 2,6-naphthalenedicarboxylic acid and 2,6-naphthalenedicarboxylic acid substituted with 1 or 2 chlorine or bromine atoms or an alkyl group containing 1 to 4 carbon atoms, (C) at least 20 mole percent 2-phenylhydroquinone, (D) 0–45 mole percent hydroquinone, and (E) 0–35 mole percent of a hydroquinone substituted with chlorine or bromine atoms or an alkyl group containing 1 to 4 carbon atoms.

2. Liquid crystalline polyesters of claim 1 wherein the polyesters are prepared by reacting at least 50 mole percent (A) and at least 50 mole percent (C).

3. Liquid crystalline polyesters of claim 1 wherein the polyesters are prepared by reacting at least 80 mole percent (A) and at least 80 mole percent (C).

4. Liquid crystalline polyesters of claim 1 wherein the polyesters are prepared by reacting 100 mole percent (A) and 100 mole percent (C).

5. Shaped article of a polyester of claim 1.
6. Shaped article of a polyester of claim 2.
7. Shaped article of a polyester of claim 3.
8. Shaped article of a polyester of claim 4.

* * * * *